United States Patent [19]

Kaufman et al.

[11] Patent Number: 5,776,625
[45] Date of Patent: Jul. 7, 1998

[54] HYDROGEN-AIR FUEL CELL

[75] Inventors: Arthur Kaufman; Peter L. Terry, both of Belleville, N.J.

[73] Assignee: H Power Corporation, Belleville, N.J.

[21] Appl. No.: 878,015

[22] Filed: Jun. 18, 1997

[51] Int. Cl.[6] ............................................. H01M 8/04
[52] U.S. Cl. ................................................. 429/30; 429/34
[58] Field of Search ........................... 429/30–34, 38–39, 429/26

[56] References Cited

U.S. PATENT DOCUMENTS

| | | | |
|---|---|---|---|
| 4,988,583 | 1/1991 | Watkins et al. | 429/30 |
| 5,108,849 | 4/1992 | Watkins et al. | 429/30 |
| 5,116,696 | 5/1992 | Barp | 429/26 |
| 5,252,410 | 10/1993 | Wilkinson et al. | 429/33 |
| 5,300,370 | 4/1994 | Washington et al. | 429/34 |
| 5,527,363 | 6/1996 | Wilkinson et al. | 429/34 X |
| 5,549,983 | 8/1996 | Yamanis | 429/32 |
| 5,641,586 | 6/1997 | Wilson | 429/30 |

*Primary Examiner*—Anthony Skapars
*Attorney, Agent, or Firm*—Salzman & Levy

[57] ABSTRACT

A reactant flow system for a proton exchange membrane (PEM), hydrogen-air, fuel cell stack, is described. The flow system includes the use of single-pass or multi-pass, flow channels. A flow channel section having at least one adjacent channel section whose reactant flows in an opposite direction thereto. The system has respective reactant inlets that are effectively adjacent to reactant outlets of the adjacent channel section. Restrictions are used at the reactant inlets to assure substantially uniform reactant flow among all of the flow channels. The PEM fuel cell stack has a mechanism for removing heat therefrom in order to prevent drying out of the electrolyte membrane.

28 Claims, 5 Drawing Sheets

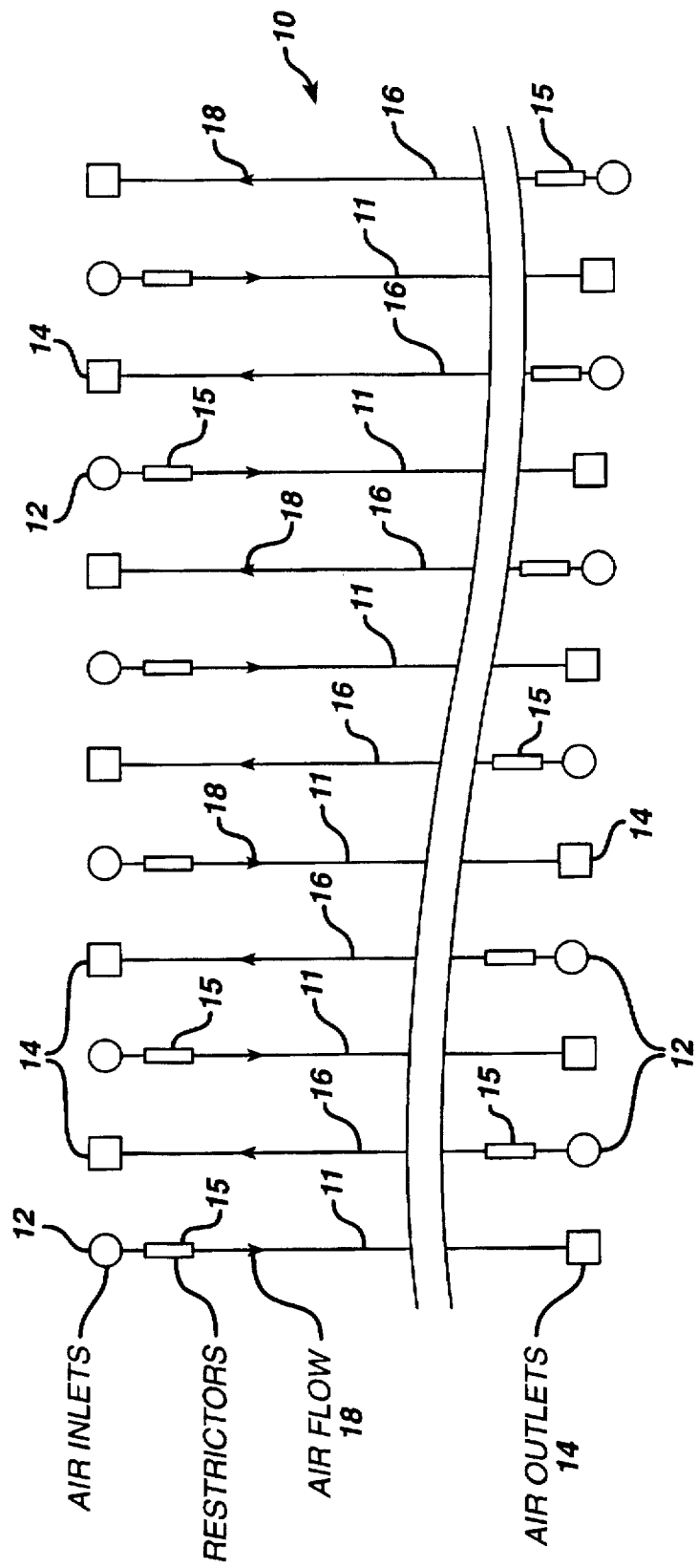

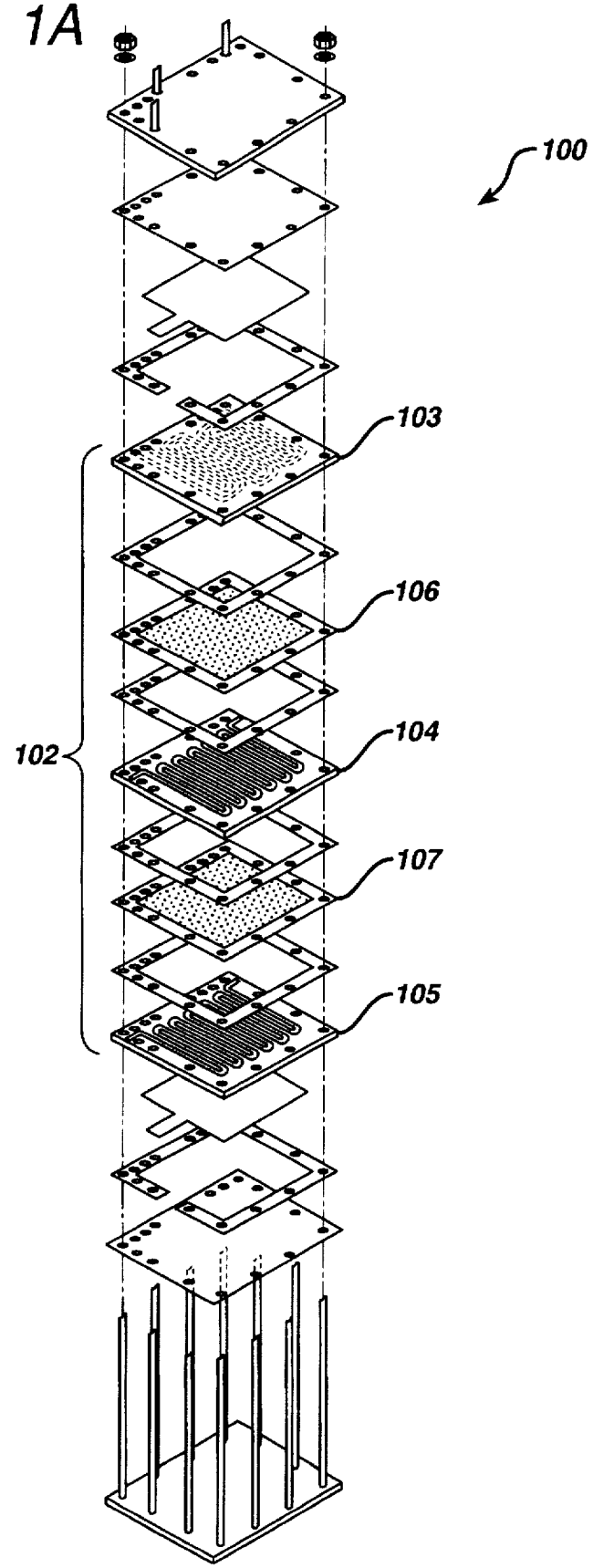

HYDROGEN-AIR FUEL CELL

FIELD OF THE INVENTION

The present invention relates to fuel cells, and more particularly to an improved hydrogen-air, proton exchange membrane (PEM) fuel cell that operates with sufficient moisture by means of countercurrent flow of reactants, especially involving air in cathode flow-field channels.

BACKGROUND OF THE INVENTION

Water management in hydrogen-air, proton exchange membrane (PEM) fuel cells has been a long standing problem. Proton exchange membrane fuel cells require relatively high humidity levels in their reactant streams to prevent dry-out of the electrolyte membrane, especially at the inlet to this device. These fuel cells must be able to maintain a high membrane ionic conductivity, or the cell performance will be seriously degraded. This necessitates that there be a high water content within the membrane. The typical prior art practice was to pre-humidify the reactant gases to avoid loss of membrane water. This procedure adds to the complexity of the system, however, and may not be feasible where the required space to accomplish this task is not available.

The present invention teaches how to alleviate membrane dry-out in the absence of reactant gas pre-humidification. The current invention delivers reactant air via two or more flow channels in each cathode flow-field of a fuel cell stack, so that a flow channel in which air flows in a given direction is always adjacent to at least one, but generally two, flow channels, with air flowing in the opposite direction. This method allows moisture exchange between relatively wet and relatively dry adjacent cell regions. The amount of moisture exchange is, of course, dependent upon the respective moisture conditions of the air in the corresponding adjacent flow channels. The inlets and outlets of each fuel cell are maintained effectively adjacent to each other, as are the channels that connect to the inlets and outlets, respectively, to prevent the gases from drying out at the inlets. The channels of the fuel cell are designed with a serpentine (or other multi-pass) pattern, in one embodiment, so that a small number of adjacent inlet-outlet pairs can feed and collect reactant gases from the entire cell surface. Uniform artificial restrictions are provided at the inlets of each flow channel of every cell in order to obtain uniformity in air flow rate among all of the parallel flow channels throughout all cells of the fuel cell stack. This is accomplished by allowing the restrictions to dominate, and thereby render effectively uniform the air flow resistances among the various flow channels.

DISCUSSION OF RELATED ART

In U.S. Pat. No. 4,988,583, issued to Watkins et al, a PEM fuel cell is illustrated, having a cathode flow field comprising a single serpentine flow channel that allows liquid product water to be removed from the cell at suitably low air flow rates.

U.S. Pat. No. 5,108,849, issued to Watkins et al on Apr. 28, 1992, for FUEL CELL FLUID FLOW FIELD PLATE, discloses a multiple parallel serpentine flow arrangement (more appropriate for larger cell areas) that utilizes single air inlet and outlet openings. However, neither U.S. Pat. No. 4,988,583 nor U.S. Pat. No. 5,108,849 teaches how to prevent drying out of the electrolyte membrane adjacent to the incoming reactant gases, because dry inlet air does not flow near moist outlet air in adjacent channels. In addition, these systems fail to teach equalizing the flow among parallel channels, as is taught by the present invention.

In U.S. Pat. Nos. 3,468,712 and 5,300,370, dead-ended interdigitated inlet and outlet channels are depicted. These channels force the air to flow through porous carbon electrode backing paper in order to reach the outlet channels from the inlet channels.

None of the above-mentioned patents is concerned with the problem of dry-out of the electrolyte membrane of a PEM fuel cell, due to the use of non-humidified reactant gases.

In U.S. Pat. No. 3,573,102, issued to Lane et al on Mar. 30, 1971, for FUEL CELL GAS MANIFOLD SYSTEM, a fuel cell is disclosed having adjacent inlets and outlets similar to this invention. However, contrary to the present invention, there are featured separate U-shaped "chambers." This chamber arrangement is not suitable for a proton exchange membrane fuel cell, since it does not provide for the removal of liquid product water. The apparatus also fails to show how to equalize the flow in the channels and would require many more inlet-outlet pairings to collect an equivalent fraction of reactant gases as does the multi-pass arrangement of the present invention.

In U.S. Pat. No. 3,573,104, issued to Snyder et al on Mar. 30, 1971, for FUEL CELL UNIT WITH NOVEL FLUID CONFINING AND DIRECTING FEATURES, a fuel cell is illustrated having a serpentine channel arrangement similar to the present invention. However, this patent does not teach how to prevent the drying out of the electrolyte membrane adjacent to the incoming reactant gases. The inlets and the outlets are non-adjacent, and the system fails to teach equalizing the flow among parallel channels, as is taught by the present invention.

In U.S. Pat. No. 3,554,803, issued to Poirier on Jan. 12, 1971, for FUEL CELL DESIGNED FOR EFFICIENT STACKING, a rudimentary system of serpentine channeling is shown. This system is not concerned with the aforementioned problem of drying out of the electrolyte membrane, nor does this patent teach the equalization of the air or gas flow.

In U.S. Pat. No. 3,372,060, issued to Platner on Mar. 5, 1968, for FLUID DISTRIBUTION MEANS, a fuel cell is illustrated that uses baffles to direct gas flow therein. However, this system is not concerned with drying out of the electrolyte membrane, nor does this patent provide for flow equalization.

SUMMARY OF THE INVENTION

In accordance with the present invention, there is provided a reactant flow system for a proton exchange membrane (PEM) hydrogen-air fuel cell. The flow system includes the use of single-pass, or multi-pass flow channels in each cell of a fuel cell stack. Each flow channel section has one or two adjacent channel sections, whose air flows in an opposite direction thereto (counter-current flow). The system comprises respective air inlets that are effectively adjacent to air outlets of the adjacent channel sections. This ensures that dry regions near the inlets can receive moisture from wet regions near the outlets. Restrictions are used at the air inlets of all flow channels within the fuel cell stack, to assure uniform air flow among all of the channels. This is accomplished by allowing the restrictions to dominate, and thereby render effectively uniform, the air flow resistances among the various flow channels. The restrictions at the inlets can comprise baffling, constrictions, and other constraints known for this purpose. The adjacent channels, or channel sections are generally parallel to each other over a substantial portion of their length. The channels can be made concentric, substantially circular, or curvilinear with respect to each other in alternate embodiments of the straight channel design. The PEM fuel cell stack is also configured to prevent drying out of the electrolyte membrane by removing heat from the stack. The fuel cell waste heat is removed to prevent the fuel cell stack from reaching temperature levels that would be high enough to cause the electrolyte membrane to dry out. The heat removal is achieved by extending the length or width of each, or for example, every other, bipolar plate, which comprises a cathode flow-field, a reactant-gas separator layer, and an anode flow-field, to form fins at opposing stack edges. The concomitant increase in stack surface area allows the stack to be cooled via air blown across its surface by a simple fan or by any suitable method. This scheme works well where the fin-to-fin width dimensions are relatively small, and the plate thermal conductivity is relatively high (e.g., for cells constructed of graphite plates). This simple but effective heat removal scheme eliminates or greatly reduces the need for inter-cell or intra-cell cooling channels, which tend to complicate the system and detract from the compactness of the stack.

The Proton Exchange Membrane (PEM) fuel cell stack comprises a plurality of cells, in which each cell of said PEM fuel cell stack comprises a positive cathode electrode at which oxygen reduction takes place, a negative anode electrode at which fuel is oxidized, a proton-exchange electrolyte membrane disposed between said positive cathode electrode and said negative anode electrode, and in which between each pair of adjacent cells there are a cathode flow-field for distributing oxygen to an adjacent cathode electrode, at a side of the adjacent cathode electrode opposite a side in contact with its corresponding proton-exchange electrolyte membrane, an anode flow-field for distributing fuel to an adjacent anode electrode, at a side of the adjacent anode electrode opposite a side in contact with its corresponding proton-exchange electrolyte membrane, and a separator layer disposed between the cathode flow-field and the anode flow-field, that serves to isolate the oxygen in the cathode flow-field from the fuel in the anode prevent said electrolyte membrane from drying out.

It should be noted that the above descriptions are presented in terms of the air flow channels of the hydrogen-air fuel cell, which are the most critical from a water management point of view. This is so, because of the higher flow rates at the fuel cell cathodes, and because of the water generation reaction taking place at the fuel cell cathodes. However, advantages in terms of the countercurrent flow approach, can be exploited with respect to the hydrogen, or fuel gas, flow channels. Accordingly, other embodiments of the invention comprise a stack of cells having the various aforementioned countercurrent flow channel configurations, as applied to the hydrogen, or fuel gas, flow channels.

It is an object of this invention to provide an improved reactant flow system for a PEM fuel cell.

It is another object of the invention to provide a reactant flow system for a PEM fuel cell having improved reactant gas humidity.

It is yet another object of this invention to provide a PEM fuel cell that does not require pre-humidification of the reactant gas.

It is a further object of the invention to provide a reactant flow system of counter-current character for a PEM fuel cell stack.

BRIEF DESCRIPTION OF THE DRAWINGS

A complete understanding of the present invention may be obtained by reference to the accompanying drawings, when considered in conjunction with the subsequent detailed description, in which:

FIG. 1a shows a perspective exploded view of a PEM fuel cell stack with individualized components of the reactant flow system of this invention (restrictors not shown);

FIG. 1 illustrates a schematic view of a straight, multi-channel, parallel, single pass, reactant flow system;

DESCRIPTION OF THE PREFERRED EMBODIMENT

Figure 1B:
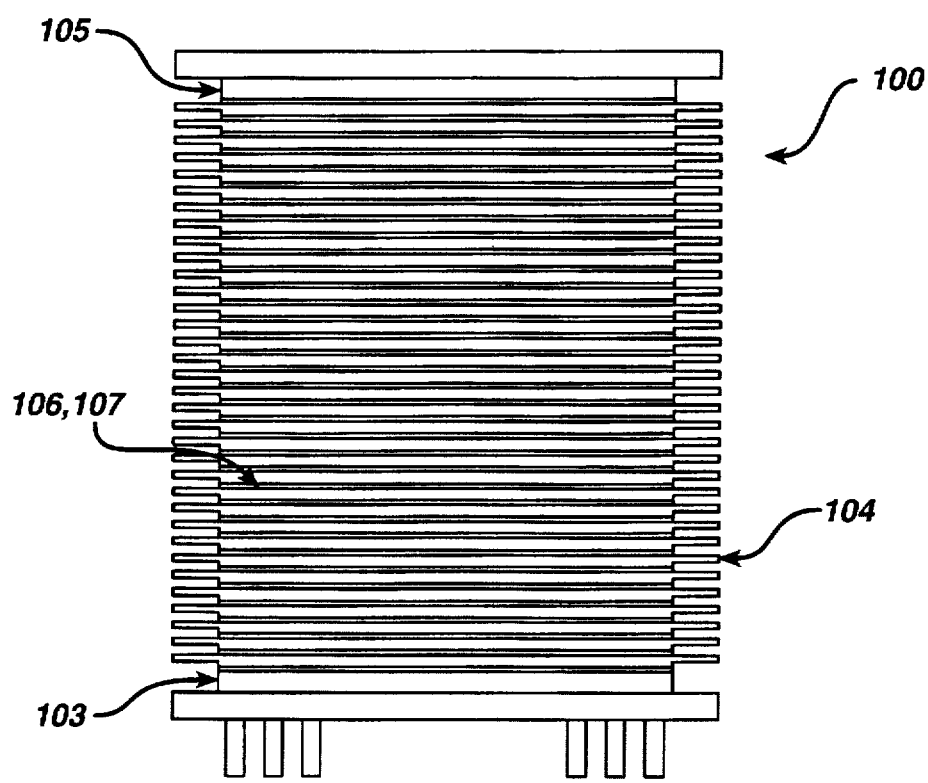
FIG. 1b depicts a front view of the assembled PEM fuel cell stack shown in FIG. 1.

Generally speaking, the invention features a hydrogen-air, PEM fuel cell operating so that its reactant gases have a relatively high humidity level throughout their gas flow channels. Proton exchange membrane (PEM) fuel cells require relatively high humidity levels in their reactant streams to prevent dry-out of the electrolyte membrane, especially at the air inlet. These cells require high membrane ionic conductivity to prevent significant losses in cell performance, which necessitates the high humidity level. To achieve the proper humidity in the cell, the prior practice was generally to pre-humidify the reactant gases. Reactant gas pre-humidification, however, results in significant volume, weight, cost and complexity for the fuel cell system. Also, certain fuel cell applications require compactness and simplicity to allow fuel cell systems to viably compete with alternative power sources. Therefore, there is substantial incentive to seek efficient and reliable PEM fuel cell operation without the need for reactant gas pre-humidification.

The present invention involves the use of a reactant air delivery scheme that provides for countercurrent flow of air in adjacent flow channels. Thus, an air inlet opening is located effectively adjacent to an air outlet opening, and vice-versa. The flow channels linking the respective inlet and outlet openings are laid out adjacent to each other over the entire length of the channels, thereby providing countercurrent flow of the adjacent air streams. This approach could involve just two channels covering the entire active area of the cell, or a multiplicity of air flow channels accomplishing the same countercurrent relationship of adjacent channels could be employed. In addition, the countercurrent scheme could be accomplished with the use of but one channel covering the entire active area of the cell.

The ambient reactant air traveling through a flow channel tends to enter in a relatively dry state, since even humid ambient air will have a relatively low relative humidity when it reaches the typically higher temperature at which a cell operates. Hence, there is the greatest tendency to dry out near the inlet of the system. As the air moves downstream, it is mixed with water vapor that is generated at the cathode catalyst sites as the product of the fuel cell reaction. This results in increasing air relative humidity and, commensurately, reduces the driving force for membrane dry-out.

Generally, air flow rates are employed that have a relatively small multiple in relation to stoichiometric flow necessary to provide oxygen for the fuel cell reaction. This serves both to mitigate the drying out tendency, and to reduce the parasitic air pumping power. Under these conditions, the air flowing through the channel will eventually become saturated with water vapor and liquid water will be formed. With appropriately designed flow-fields, the liquid water formed will be carried out of the flow channel by the reactant air stream.

Thus, beyond a relatively dry region near the air inlet, the reactant air becomes infused with $H_2O$ to the extent that it reaches 100% relative humidity and then entrains excess water as a liquid. However, without the method of this invention, the dry-out region near the inlet can advance progressively into the channel with time, since the water-generating reaction will become retarded as the electrolyte membrane dries out near the inlet. Consequently, the reactant air must travel further into the channel before it reaches full humidification, thus causing ongoing deterioration of fuel cell performance, as the effective area of the electrolyte membrane diminishes.

Now referring to FIG. 1a, a Proton Exchange Membrane (PEM) fuel cell stack 100, is shown in a perspective, exploded view. The fuel cell stack is comprised of a plurality of cells 102, comprised of repeating components, including membrane-electrode assemblies, each comprising an electrolyte membrane 106 and 107 about which a positive cathode electrode 103 and a negative anode electrode 105 are positioned; bipolar plates 104, each comprising an anode flow-field 101, a reactant-gas separator layer, and a cathode flow-field 108; and termination components. Oxygen reduction occurs at the positive cathode electrode 103. Fuel, such as hydrogen, is oxidized at the negative anode electrode 105. A cathode flow-field 108 for distributing oxygen to an adjacent cathode electrode 103 is disposed at a side of the adjacent cathode electrode 103 that is opposite to the side in contact with its corresponding proton-exchange electrolyte membrane 107. Similarly, an anode flow-field 101 for distributing fuel to an adjacent anode electrode 105 is disposed at a side of the adjacent anode electrode 105 opposite a side in contact with its corresponding proton-exchange electrolyte membrane 106. The separator layer of the bipolar plate 104 separates the cathode flow-field 108 and the anode flow-field 101, and serves to isolate the oxygen in the cathode flow-field 108 from the fuel in the anode flow field 101. The PEM fuel cell stack is configured to prevent said electrolyte membranes from drying out, as will be explained in more detail with reference to the subsequent FIGURES.

Referring to FIG. 1b, the PEM fuel cell stack 100 is shown in its assembled state.

Referring to FIG. 1, the reactant flow system 10 is illustrated in accordance with this invention. The system 10 entails the use of alternating, parallel straight-through single channels 11 with adjacent channels 16 carrying air in the opposite direction. The flow system 10 counteracts the drying in the reactant air inlet regions 12 via the migration of water, not shown, to these regions from adjacent, moisture-laden regions disposed in the outlet sections 14. The inlet sections 12 are in communication with the outlet sections 14 of the impacting, adjacent, reactant air flow channels 16, which carry an excess of water, as described above. The water migrates to the dry sections in directions that are perpendicular to the direction of air flow, the latter of which are illustrated by arrows 18. The water migrates through the cathode electrode, not shown, and through the electrolyte membrane itself, not shown.

The flow channels 16 are closely spaced, being between approximately 0.1 and 0.2 cms apart, extremity to extremity. Therefore, the distances over which the water must migrate are rather short. Thus, the flow scheme 10 serves to substantially reduce the dry-out in the fuel cell, despite there being no reactant gas pre-humidification. The system 10 also provides efficient, stable operation in all regions of the cell. It should be noted that the same countercurrent approach may be used beneficially with the hydrogen (or fuel) reactant gas, although the effect is less critical.

The reactant flow system 10 of this invention might require that additional means be taken to assure reasonably uniform distribution of reactant air among the many parallel flow channels 11 and 16 within the cell illustrated, as well, as among all of the cells of the stack. Artificial restrictions 15 at the inlet 12 of each flow channel 11 and 16, respectively, dominate the total resistance to air/water flow through the respective flow channels. This encourages uniform flow through the parallel flow channels by muting the effects of random changes in flow resistance within the various channels.

Figure 2:
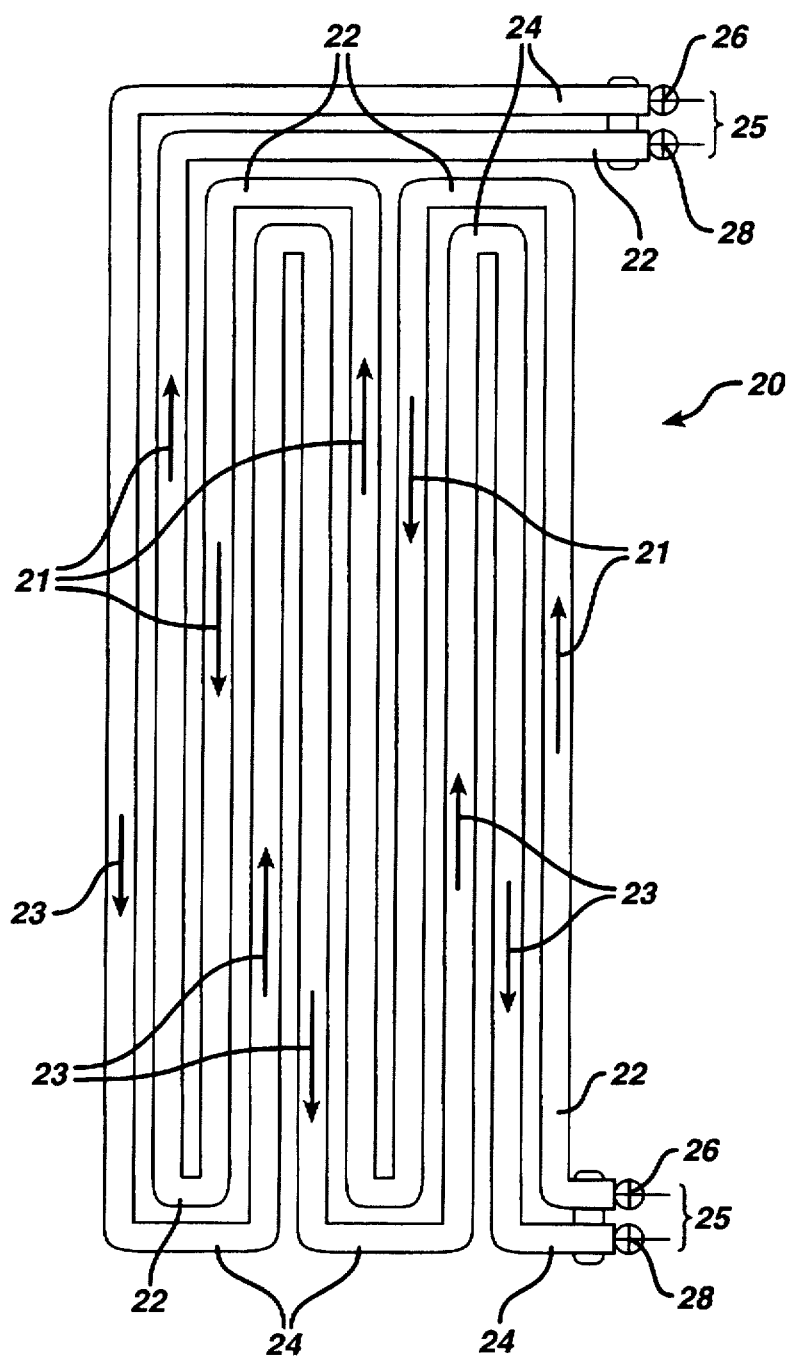
FIG. 2 shows a schematic view of an alternate embodiment of the reactant flow system of FIG. 1, in accordance with the PEM fuel cell stack shown in FIGS. 1a and 1b, wherein the system comprises a single pair of serpentine channels.

Referring now also to FIG. 2, an alternate embodiment 20 to the reactant flow system 10 of FIG. 1 is shown for the PEM fuel cell stack 100 of FIGS. 1a and 1b. The flow system 20 includes the use of pairs (one pair in this case, but possibly two pairs or more, in general) of serpentine, or other multi-pass, flow channels 22 and adjacent channels 24 having reactant air flow in opposite directions, as shown by arrows 21 and 23, respectively. The system 20 utilizes, for the purposes of clarity, only one pair of air flow channels, depicted by brackets 25. The respective air inlets 26 are adjacent to the air outlets 28 of the adjacent channels 22 and 24, respectively. Restrictions, not shown, are used at the air inlets 26, to assure uniform air flow between the two adjacent channels 22 and 24, respectively, or among all of the channels, if more than one pair is used, and among all of the channels in the cells of the fuel cell stack, not shown. The air flow restrictions can comprise baffling, constrictions, and other flow constraints known in the art.

Figure 3:
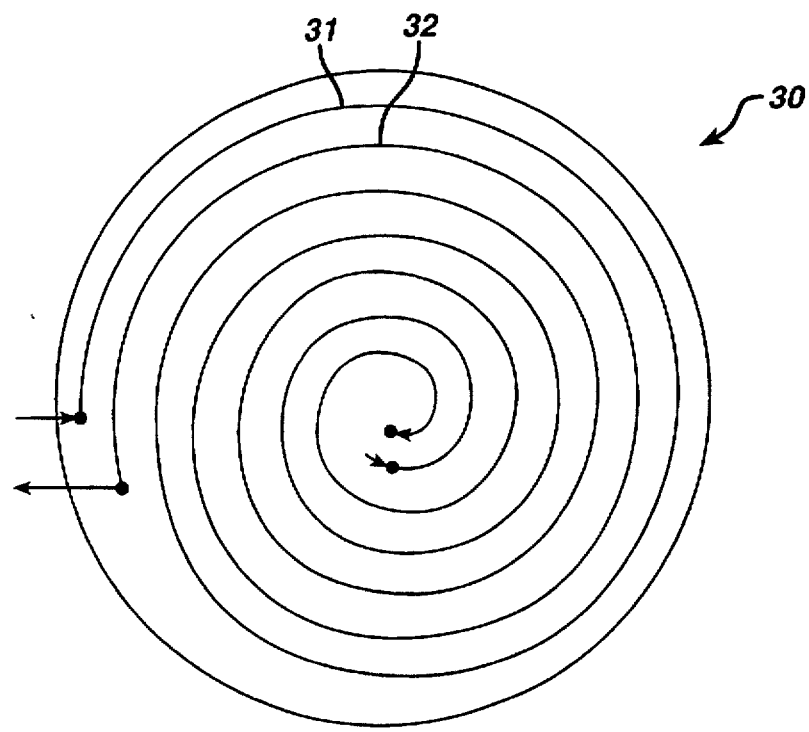
FIG. 3 depicts a schematic view of a second alternate embodiment of the reactant flow system illustrated in FIG. 2, wherein the serpentine channels are concentrically configured.

Referring to FIG. 3, an alternate embodiment reactant flow system 30 is depicted. The system 30 shows the serpentine channels 31 and 32, respectively, arranged in a concentric or a substantially circular pattern. The circular pattern can also take the form of a curvilinear configuration.

Figure 4:
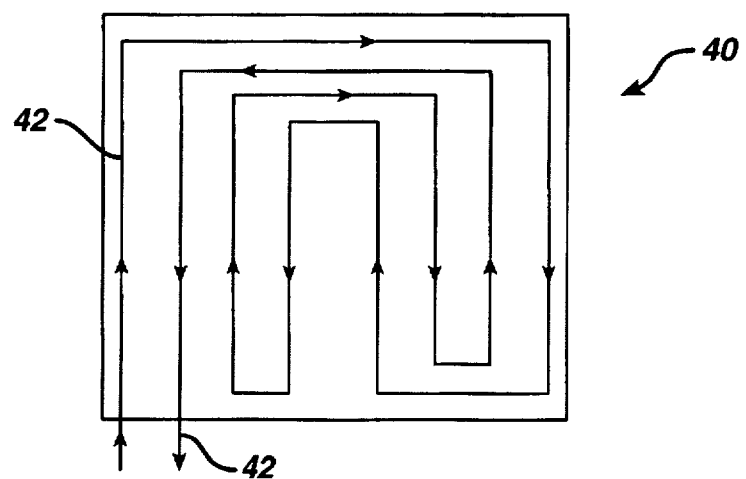
FIG. 4 illustrates a schematic view of a third alternate embodiment of the reactant flow system shown in FIG. 2, featuring a single channel pathway.

Referring to FIG. 4, a schematic is shown of a third embodiment 40 of the reactant flow system shown in FIG. 2. The system 40 comprises a single channel 42 of counter-current character, or multiple channels, each having countercurrent character, per se. This geometry has a higher pressure drop in comparison to those using countercurrent pairs of channels.

The reactant flow systems illustrated herein feature a complementary heat removal scheme. The heat is removed to prevent the fuel cell stack from reaching temperature levels that would be high enough to cause the electrolyte membrane to dry out. The heat removal is achieved by extending the length or width of each, or every other, bipolar plate, which comprises a cathode flow-field, a reactant gas separator layer, and an anode flow-field, not shown, or bipolar plate elements, not shown, to form fins at opposing stack edges. The concomitant increase in stack surface area allows the stack to be cooled via air that is blown across its surface by a simple fan. This scheme works well where the fin-to-fin width dimensions are relatively small, and the plate thermal conductivity is relatively high (e.g., for cells constructed of graphite plates). This beneficial heat removal scheme eliminates or greatly reduces the need for inter-cell or intra-cell cooling channels, which tend to complicate the system and detract from the compactness of the stack.

It should be observed that the same countercurrent approaches described for systems 20, 30 and 40, with respect to the air channels, may also be beneficially used for the hydrogen (or fuel) reactant gas.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A reactant flow system for a Proton Exchange Membrane (PEM) fuel cell stack comprising a plurality of cells in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing fuel to an adjacent anode electrode, at a side of said adjacent anode electrode opposite a side in contact with a corresponding proton-exchange electrolyte membrane, and a reactant separator layer disposed between said cathode flow-field and said anode flow-field, said reactant separator layer isolating said oxygen in said cathode flow-field from said fuel in said anode flow-field, said PEM fuel cell stack being configured to prevent said electrolyte membrane from drying out, wherein said flow-field for at least one reactant of said reactant oxygen and said reactant fuel, includes at least one pair of reactant flow channels, and further wherein at least a portion of each reactant flow channel is operatively adjacent to at least one corresponding flow channel such that a reactant flow direction in the flow channel is opposite a reactant flow direction in at least one operatively adjacent flow channel, and each reactant flow channel has a reactant inlet and a reactant outlet.

2. The reactant flow system for a PEM fuel cell stack in accordance with claim 1, wherein each reactant inlet includes means for providing substantially uniform reactant flow among all of the reactant flow channels in said fuel cell stack for a corresponding reactant.

3. The reactant flow system for a PEM fuel cell stack in accordance with claim 1, further comprising heat removal means configured in association with the PEM fuel cell stack for preventing said electrolyte membrane from drying out.

4. The reactant flow system for a PEM fuel cell stack in accordance with claim 1, wherein said reactant flow channels are substantially parallel to each other over a substantial portion of their length, and are configured for single pass flow.

5. The reactant flow system for a PEM fuel cell stack in accordance with claim 1, wherein said reactant flow channels are substantially parallel to each other over a substantial portion of their length, and are configured for multiple pass flow.

6. The reactant flow system for a PEM fuel cell stack in accordance with claim 5, wherein said reactant flow channels are serpentine for at least a portion of their length.

7. The reactant flow system for a PEM fuel cell stack in accordance with claim 2, wherein said means for providing substantially uniform flow further comprises a substantially uniform restriction in each of said inlets.

8. The reactant flow system for a PEM fuel cell stack in accordance with claim 7, wherein said substantially uniform restriction includes baffling.

9. The reactant flow system for a PEM fuel cell stack in accordance with claim 8, wherein said reactant flow channels are substantially parallel to each other over a substantial portion of their length, and are configured for multiple pass flow.

10. The reactant flow system for a PEM fuel cell stack in accordance with claim 8, wherein said reactant flow channels are substantially parallel to each other over a substantial portion of their length, and are configured for single pass flow.

11. The reactant flow system for a PEM fuel cell stack in accordance with claim 9, wherein said reactant flow channels are serpentine for at least a portion of their length.

12. The reactant flow system for a PEM fuel cell stack in accordance with claim 7, wherein said restriction includes a substantially uniform constriction in each of said inlets.

13. The reactant flow system for a PEM fuel cell stack in accordance with claim 12, wherein said reactant flow channels are substantially parallel to each other over a substantial portion of their length, and are configured for single pass flow.

14. The reactant flow system for a PEM fuel cell stack in accordance with claim 12, wherein said reactant flow channels are substantially parallel to each other over a substantial portion of their length, and are configured for multiple pass flow.

15. The reactant flow system for a PEM fuel cell stack in accordance with claim 14, wherein said reactant flow channels are serpentine for at least a portion of their length.

16. The reactant flow system for a PEM fuel cell stack in accordance with claim 3, wherein said reactant flow channels are substantially parallel to each other over a substantial portion of their length, and are configured for multiple pass flow.

17. The reactant flow system for a PEM fuel cell stack in accordance with claim 16, wherein said reactant flow channels are serpentine for at least a portion of their length.

18. The reactant flow system for a PEM fuel cell stack in accordance with claim 3, wherein said reactant flow channels are substantially parallel to each other over a substantial portion of their length, and are configured for single pass flow.

19. A reactant flow system for a Proton Exchange Membrane (PEM) fuel cell stack comprising a plurality of cells, in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing reactant fuel to an adjacent anode electrode, at a side of said adjacent anode opposite a side in contact with a corresponding proton-exchange electrolyte membrane, and a separator layer disposed between said cathode flow-field and said anode flow-field, said separator layer isolating said reactant oxygen in said cathode flow-field from said reactant fuel in said anode flow-field, said PEM fuel cell stack being configured to prevent said electrolyte membrane from drying out, wherein said flow-field for at least one of said reactants of said reactant oxygen and said reactant fuel comprises at least one multi-pass flow channel, and further wherein said at least one multi-pass flow channel has at least a portion that is configured so that reactant flow is in a direction opposite to a reactant flow direction of at least one adjacent flow channel section, and each configured multi-pass flow channel having a reactant inlet and a reactant outlet.

20. The reactant flow system for a PEM fuel cell stack in accordance with claim 19, wherein each reactant inlet includes means for providing substantially uniform reactant flow among all of the reactant flow channels in said fuel cell stack for a corresponding reactant.

21. The reactant flow system for a PEM fuel cell stack in accordance with claim 19, further comprising heat removal means configured in association with the PEM fuel cell stack for preventing said electrolyte membrane from drying out.

22. The reactant flow system for a PEM fuel cell stack in accordance with claim 19, wherein said reactant flow channels are serpentine for at least a portion of their length.

23. The reactant flow system for a PEM fuel cell stack in accordance with claim 21, wherein said reactant flow channels are serpentine for at least a portion of their length.

24. The reactant flow system for a PEM fuel cell stack in accordance with claim 20, wherein said means for providing substantially uniform flow further comprises a substantially uniform restriction in each of said inlets.

25. The reactant flow system for a PEM fuel cell stack in accordance with claim 24, wherein said substantially uniform restriction includes baffling.

26. The reactant flow system for a PEM fuel cell stack in accordance with claim 25, wherein said reactant flow channels are serpentine for at least a portion of their length.

27. The reactant flow system for a PEM fuel cell stack in accordance with claim 24, wherein said restriction includes a substantially uniform constriction in each of said inlets.

28. The reactant flow system for a PEM fuel cell stack in accordance with claim 27, wherein said reactant flow channels are serpentine for at least a portion of their length.

* * * * *